(12) United States Patent
Sugiyama et al.

(10) Patent No.: US 10,894,376 B2
(45) Date of Patent: Jan. 19, 2021

(54) PNEUMATIC TIRE AND MANUFACTURING METHOD THEREFOR

(71) Applicant: SUMITOMO RUBBER INDUSTRIES, LTD., Kobe (JP)

(72) Inventors: Naoki Sugiyama, Kobe (JP); Tomoharu Torii, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 881 days.

(21) Appl. No.: 15/631,507

(22) Filed: Jun. 23, 2017

(65) Prior Publication Data

US 2017/0282473 A1    Oct. 5, 2017

Related U.S. Application Data

(62) Division of application No. 14/356,532, filed as application No. PCT/JP2012/080311 on Nov. 22, 2012, now abandoned.

(30) Foreign Application Priority Data

Dec. 15, 2011  (JP) ................................. 2011-274779

(51) Int. Cl.
  *B29D 30/48*      (2006.01)
  *B60C 15/00*      (2006.01)
  (Continued)

(52) U.S. Cl.
  CPC ......... *B29D 30/48* (2013.01); *B29D 30/1621* (2013.01); *B29D 30/34* (2013.01);
  (Continued)

(58) Field of Classification Search
  CPC ..................................................... B29D 30/48
  (Continued)

(56) References Cited

U.S. PATENT DOCUMENTS 3,170,662 A      2/1965  Anderson
4,219,375 A *   8/1980  Vandale ................. B29D 30/48
                                                          140/88

(Continued)

FOREIGN PATENT DOCUMENTS

EP    0 400 298 A1   12/1990
EP    0 467 277 A1    1/1992
(Continued)

OTHER PUBLICATIONS

International Search Report issued in PCT/JP2012/080311, dated Feb. 26, 2013.
(Continued)

*Primary Examiner* — Robert C Dye
(74) *Attorney, Agent, or Firm* — Birch, Stewart, Kolasch & Birch, LLP

(57) ABSTRACT

The present invention has an object of providing a pneumatic tire that exhibits better uniformity by improving the wire wound body for constituting the bead core. The pneumatic tire 1 comprises a bead core 5 comprising a wire wound body 10 in which one bead wire 10a is spirally wound in a continuous around a tire rotational axis CL so that a plurality of layers of the bead wire are formed in a radial direction of the tire. The wire wound body 10 comprises a first part 13 and a second part 14. The first part 13 comprises a plurality of layers of the bead wire 10a each circumferentially extending with a constant radius from the tire rotational axis CL. The second part comprises a plurality of layers of the bead wire 10a each circumferentially extending while changing its radius from the tire rotational axis CL.

3 Claims, 6 Drawing Sheets

(51) Int. Cl.
  *B29D 30/16*  (2006.01)
  *B29D 30/34*  (2006.01)
  *B60C 15/04*  (2006.01)
  *B29K 305/00* (2006.01)

(52) U.S. Cl.
  CPC .......... *B60C 15/0018* (2013.01); *B60C 15/04* (2013.01); *B29D 2030/485* (2013.01); *B29K 2305/00* (2013.01); *B60C 2015/046* (2013.01); *B60C 2015/048* (2013.01)

(58) Field of Classification Search
  USPC ....................................................... 156/136
  See application file for complete search history.

(56) References Cited

U.S. PATENT DOCUMENTS

| | | | |
|---|---|---|---|
| 5,099,902 | A | 3/1992 | Shurman |
| 5,660,656 | A | 8/1997 | Herbelleauu et al. |
| 2006/0096690 | A1 | 5/2006 | Nakata |
| 2010/0043948 | A1* | 2/2010 | Mizota ................... B29D 30/48 156/117 |

FOREIGN PATENT DOCUMENTS

| | | |
|---|---|---|
| EP | 1 911 573 A1 | 4/2008 |
| JP | 3-67709 A | 3/1991 |
| JP | 6-16018 A | 1/1994 |
| JP | 6-156024 A | 6/1994 |
| JP | 2003-146027 A | 5/2003 |
| JP | 2005-335081 A | 12/2005 |
| JP | 2006-160236 A | 6/2006 |
| WO | WO 01/43957 A1 | 6/2001 |
| WO | WO 2011/030765 A1 | 3/2011 |

OTHER PUBLICATIONS

Search Report dated May 15, 2015 for European Application No. 12857840.8.

U.S. Office Action for U.S. Appl. No. 14/356,532 dated Apr. 6, 2017.

U.S. Office Action for U.S. Appl. No. 14/356,532 dated Dec. 15, 2016.

* cited by examiner

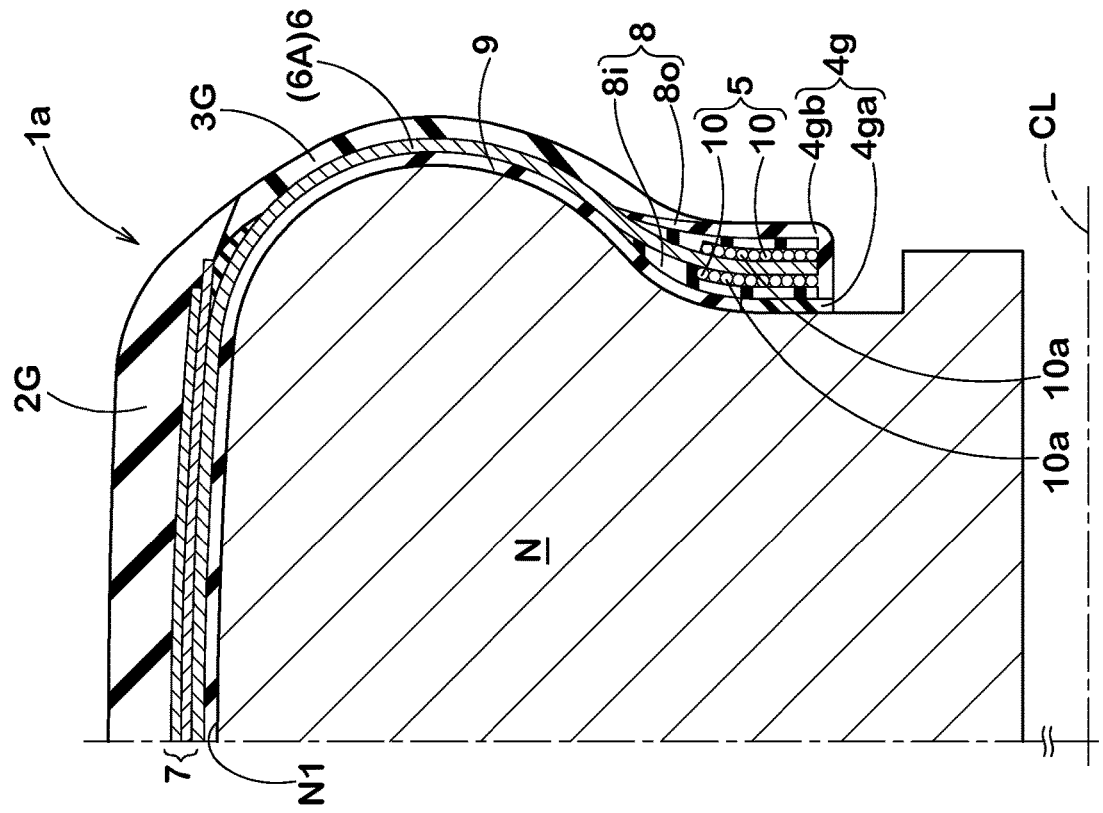
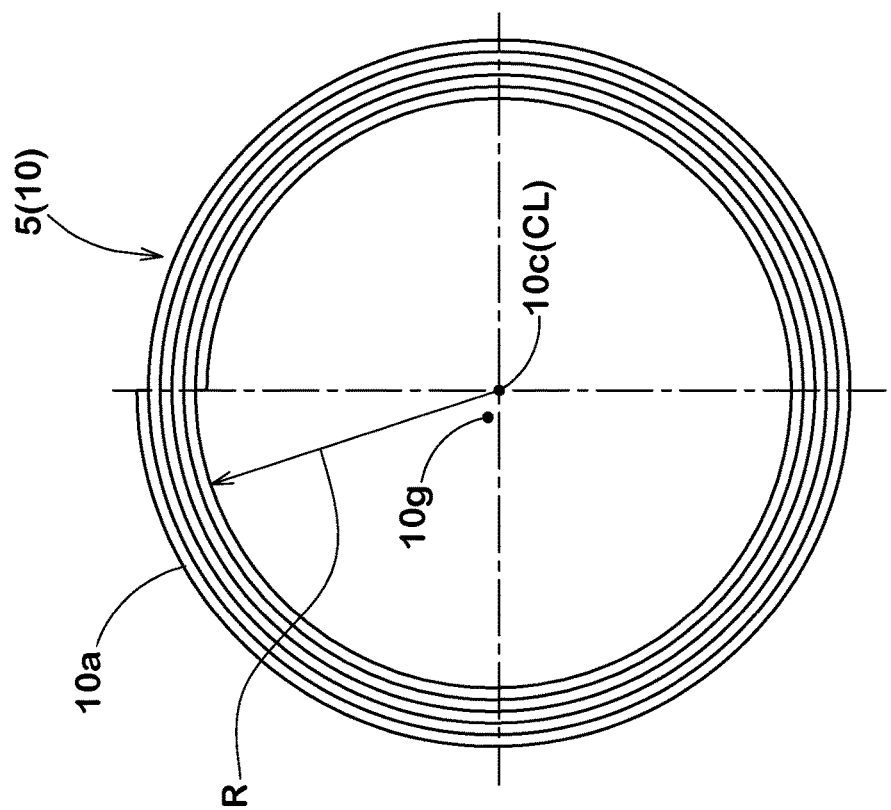

PNEUMATIC TIRE AND MANUFACTURING METHOD THEREFOR

This application is a Division of U.S. patent application Ser. No. 14/356,532 filed on May 6, 2014, which is the National Phase of PCT/JP2012/080311 filed Nov. 22, 2012, which claims priority under 35 U.S.C. § 119(a) to Patent Application No. 2011-274779 filed in Japan on Dec. 15, 2011, all of which are hereby expressly incorporated by reference into the present application.

TECHNICAL FIELD

The present invention relates to a pneumatic tire that exhibits better uniformity by improving a wire wound body for constituting its bead core, and a method for manufacturing the same.

BACKGROUND ART

Conventionally, as shown in FIG. 6(a), a method for manufacturing a pneumatic tire, which uses an inner core N for molding a green tire having an outer surface corresponding to a tire inner cavity to be manufactured (hereinafter, such a method is called as "core molding method") is proposed. The core molding method includes a process in which various kinds of tire components such as an inner liner 9, an inner apex rubber 8i, an outer apex rubber 8o, a carcass ply 6A, a bead core 5, a belt 7, a tread rubber 2G, and a sidewall rubber 3G are attached and assembled on the inner core N to mold a green tire 1a. The method further comprises a process in which the green tire 1a with the inner core N is vulcanized in a tire mold. Since the core molding method may minimize a stretch of the green tire during the vulcanizing process, a tire with better uniformity is produced.

In the core molding method, the carcass ply 6A is assembled in the green tire without being turned up its both ends around the bead core. Hence, for the bead core 5 to be assembled in the green tire 1a, a wire wound body 10 that is arranged axially one side or both sides (both sides in this embodiment) of the carcass ply 6A in each bead portion is employed. As shown in FIG. 6(b), the wire wound body 10 is formed by spirally wound a bead wire 10a, for example.

The bead wire 10a of the conventional wire wound body 10 is wound so that a radius R of curvature of the bead wire 10b a from its winding center 10c is gradually increased. Such a configuration of the wire wound body 10 may lead to deterioration of weight uniformity of the tire because the wire wound body 10 has its gravity center 10g in different place with respect to its winding center 10c.

RELATED ART DOCUMENTS

Patent Documents

[Patent Document 1] Japanese Unexamined Patent Application Publication No. 2006-160236

SUMMARY OF INVENTION

Problem to be Solved by the Invention

The present invention has been worked out in the light of the circumstances described above, and has a main object of providing a pneumatic tire that exhibits better uniformity by improving the wire wound body for constituting the bead core, and a method for manufacturing the same.

Means for Solving the Problem

In accordance with the present invention according to claim 1, there is provided a pneumatic tire comprising a tread portion, a pair of sidewall portions, a pair of bead portions each with a bead core therein, a carcass extending between the bead cores, at least one of the bead cores comprising a wire wound body in which one bead wire is spirally wound in a continuous around a tire rotational axis so that a plurality of layers of the bead wire are formed in a radial direction of the tire, and the wire wound body comprising a first part and a second part, the first part comprising a plurality of layers of the bead wire each extending in a circumferential direction of the tire having a constant radius from the tire rotational axis, the second part comprising a plurality of layers of the bead wire each extending in the circumferential direction of the tire while changing its radius from the tire rotational axis.

In accordance with the present invention according to claim 8, there is provided a method for manufacturing the pneumatic tire according to any one of claims 1 to 7, the method comprising a wire wound body forming step in which one bead wire is spirally wound in a continuous on a predetermined area of a side surface of an inner core to form the wire wound body, wherein the wire wound body forming step comprises a wire fixing step in which a winding-starting end of the bead wire is pushed and fixed on the predetermined area, and then a wire winding step in which the bead wire is spirally wound on the predetermined area by rotating the inner core around the tire rotational axis, wherein the wire winding step comprises a first rotating step in which the inner core rotates to wind the bead wire while maintaining an angle α1 in constant between the tire rotational axis and a Y-axis direction that is a feeding direction of the bead wire to the inner core, and a second rotating step in which the inner core rotates to wind the bead wire while gradually increasing the angle α1.

Effect of the Invention

The pneumatic tire in accordance with the present invention includes a wire wound body in which one bead wire is spirally wound in a continuous around a tire rotational axis so that a plurality of layers of the bead wire are formed in a radial direction of the tire. The wire wound body includes a first part and a second part. The first part includes a plurality of layers of the bead wire each extending in a circumferential direction of the tire having a constant radius from the tire rotational axis. The second part includes a plurality of layers of the bead wire each extending in the circumferential direction of the tire while changing its radius from the tire rotational axis. Since the wire wound body having the first part may have its gravity center so as to be close to the tire rotational axis that corresponds to the winding center of the bead wire, better weight uniformity around the tire rotational axis may be offered.

BRIEF DESCRIPTION OF THE DRAWINGS

FIG. 6(*a*) is a cross sectional view illustrating the right half of a green tire according to a core molding method.

FIG. 6(*b*) is a side view illustrating a conventional wire wound body.

MODE FOR CARRYING OUT THE INVENTION

An embodiment of the present invention is described in detail below with reference to the accompanying drawings.

Figure 1:
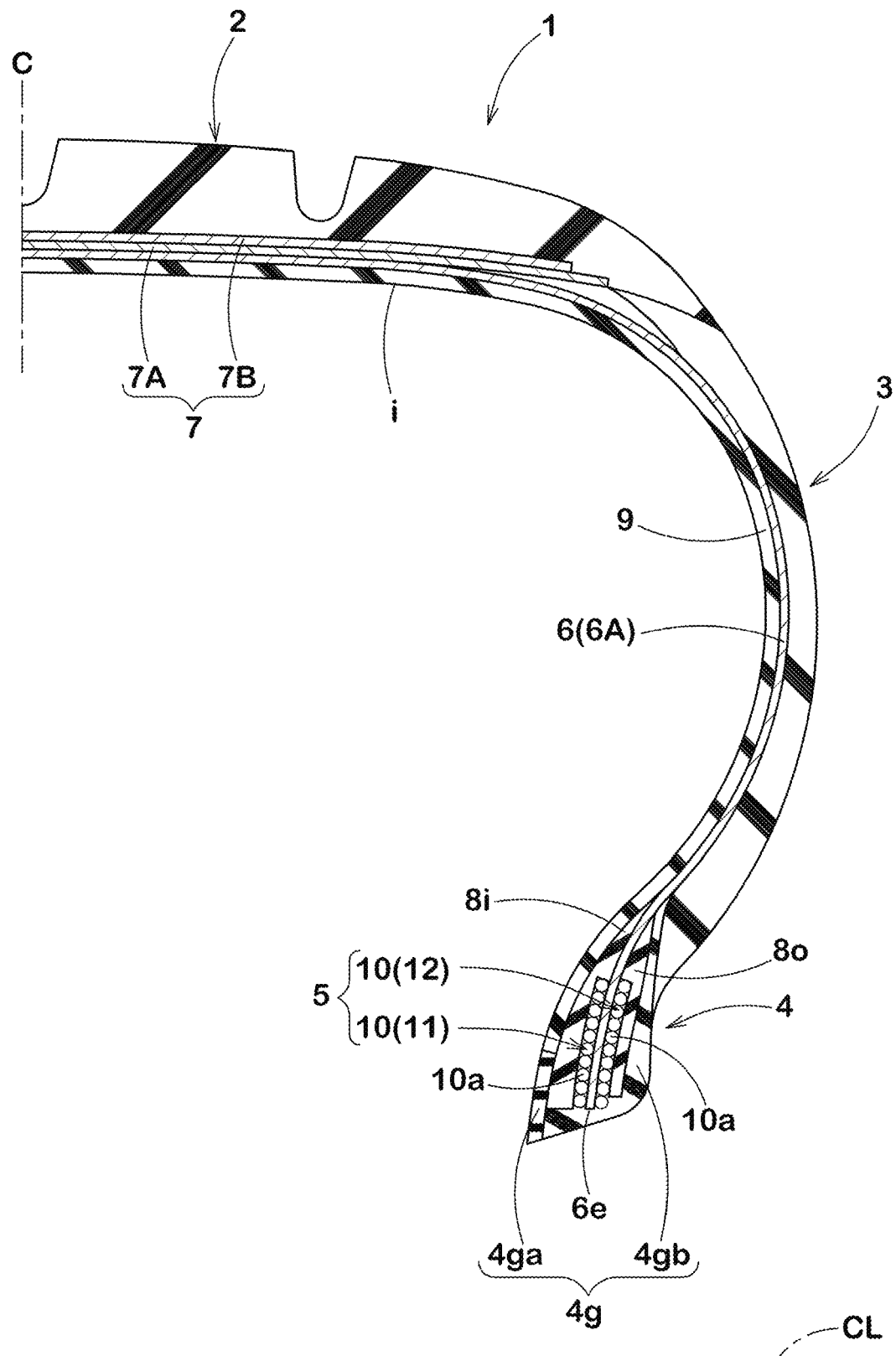
FIG. 1 is a cross sectional view illustrating the right half of a pneumatic tire in accordance with an embodiment of the present invention.

As shown in FIG. 1, a pneumatic tire (hereinafter, it may be simply referred to the "tire") 1 in accordance with the present invention includes a tread portion 2, a pair of sidewall portions 3, a pair of bead portions 4 each with a bead core 5 therein, and a carcass 6 extending between bead cores 5 and 5. The tire 1 in accordance with the present embodiment is embodied as a passenger car tire. The tire 1 further includes a belt layer 7 disposed radially outward of the carcass 6 in the tread portion 2, and an inner liner 9 disposed inside the carcass 6. The inner liner 9 that is made of an air impermeable rubber forms an inner cavity surface (i) of the tire.

FIG. 1 illustrates the tire 1 under a standard condition in which the tire 1 is mounted on a standard wheel rim (not shown) and inflated to a standard pressure but no tire load is loaded.

Here, the standard wheel rim is a wheel rim officially approved for the tire by standards organizations, and the standard wheel rim is the "standard rim" specified in JATMA, the "Measuring Rim" in ETRTO, the "Design Rim" in TRA or the like, for example. The standard pressure is a pressure officially approved for the tire by standards organizations, and the standard pressure is the "maximum air pressure" in JATMA, the "Inflation Pressure" in ETRTO, and the maximum pressure given in the "Tire Load Limits at Various Cold Inflation Pressures" table in TRA or the like. However, in case of a passenger car tire, the standard pressure is uniformly defined as 180 kPa.

The carcass 6 includes a carcass ply 6A of cords which extends between bead cores 5 and 5 through the tread portion 2 and sidewall portions 3. Each of both ends of the carcass ply 6A terminates at the bead core 5 without being turned up around the bead core 5. The carcass cords are arranged at an angle in a range of from 75 to 90 degrees with respect to a tire equator C. For the carcass cords, an organic fiber cord is employed, for example.

The belt layer 7 includes at least two belt plies of belt cords laid at an angle in a range of from 15 to 40 degrees with respect to the tire equator C. In this embodiment, the belt layer 7 includes two belt plies 7A and 7B overlapped each other so that each belt cords of plies are crossed. For the belt cords, a steel cord is employed for example.

The bead portion 4 is disposed a chafer rubber 4 with high hardness for preventing wear due to contact with the wheel rim (not shown). The chafer rubber 4*g* in this present embodiment includes an inner portion 4*ga* extending along the inner cavity surface (i) of the tire, and an outer portion 4*gb* extending along the bottom of the bead portion 4 and outer surface of the bead portion 4 so as to have a U-shaped cross section.

In order to enhance the rigidity of the bead portion 4, the bead portion 4 is further disposed an inner apex rubber 8*i* arranged axially inward of the carcass 6, and an outer apex rubber 8*o* arranged axially outward of the carcass 6. Each of the apex rubber 8*i* and 8*o* tapers off to its radially outer end.

The bead core 5 includes a wire wound body 10 in which one bead wire 10*a* is spirally wound along the carcass ply 6A.

The bead core 5 is employed an inner wire wound body 11 arranged axially inward of the carcass ply 6A, and an outer wire wound body 12 arranged axially outward of the carcass ply 6A. In this embodiment, each of the wire wound bodies 11 and 12 is configured to a single stack of bead wires in the radial direction of the tire. In another aspect of the invention, each of the wire wound body 11 and 12 may be configured to a plurality of stacks of bead wires, which are laterally and adjacently arranged. The end portion 6*e* of the carcass ply 6A is sandwiched in between the inner wire wound body 11 and the outer wire wound body 12 to be firmly fixed therebetween. In this embodiment, the number of winding of the bead wire in each wire wound body 11 and 12 are the same. In another aspect of the invention, the number of winding of the bead wire in each wire wound body 11 and 12 may be different.

As shown in FIG. 2(*a*), the wire wound body 10 is formed by spirally wound one bead wire 10*a* around a winding center 10*c* corresponding to the tire rotational axis CL so that a plurality of layers of the bead wire 10*a* are formed in the radial direction of the tire.

The wire wound body 10 includes a first part 13 and a second part 14. The first part 13 includes a plurality of layers of the bead wire 10*a* each extending in a circumferential direction of the tire having a constant radius R from the tire rotational axis CL. The second part 14 includes a plurality of layers of the bead wire 10*a* each extending in the circumferential direction of the tire while changing its radius from the tire rotational axis CL.

Since the wire wound body 10 including the first part 13 may have its gravity center 10*g* so as to be close to the tire rotational axis CL that corresponds to the winding center 10*c*, better weight uniformity around the tire rotational axis may be offered.

The first part 13 occupies most of the wire wound body 10.

Preferably, the second part 14 has the central angle θ1 in a range of from 4 to 20 degrees of the wire wound body 10. When the central angle θ1 of the second part 14 is excessively small, uniformity of the tire may be deteriorated due to a difficulty in maintaining the shape of the second part 14. When the central angle θ1 of the second part 14 is excessively large, the difference between the winding center 10*c* of the wire wound body 10 and its gravity center 10*g* might become larger. Preferably, the central angle θ1 of the second part 14 is set in a range of not less than 4 degrees, more preferably not less than 8 degrees, but preferably not more than 20 degrees, more preferably not more than 16 degrees.

The second part 14 includes a plurality of layers of the bead wire each radius gradually increasing from a side of a winding-starting end 10*s* toward a side of a winding-terminal end 10*e* of the bead wire 10*a*. The amount of increase of the radius R of the second part 14 from a side of a winding-starting end 10*s* toward a side of a winding-terminal end 10*e* corresponds to a diameter d of the bead wire 10*a*.

The second part 14 is configured as a straight part 14*a* that extends in a straight manner between the end 13*e* of the first part 13 and the end 14*e* of the second part 14. In another aspect of the present invention, the second part 14 may be configured as an arc part 14b(shown in FIG. 2(b)) that extends in an arc manner.

In the wire wound body, radially adjacent layers of the bead wire 10a are arranged so as to come into contact one another. This configuration may be helpful to further reduce the difference between the gravity center 10c of the wire wound body 10 and the winding center 10c.

The wire wound body 10 has a winding-starting end 10a and a winding-terminal end 10e, and the winding-terminal end 10e is provided with the same position of the winding-starting end 10a in the circumferential direction. Namely, the winding-terminal end 10e is positioned on a radial line that passes both the tire rotational axis CL and the winding-starting end 10s. This configuration may be helpful to further reduce the difference between the gravity center 10c of the wire wound body 10 and the winding center 10c.

The tire 1 in accordance with the present embodiment is manufactured from a green tire 1a like the one shown in FIG. 6(a) through a vulcanization process. Hereinafter, the method and apparatus M for manufacturing the tire (green tire 1a) will be described.

Figure 3:
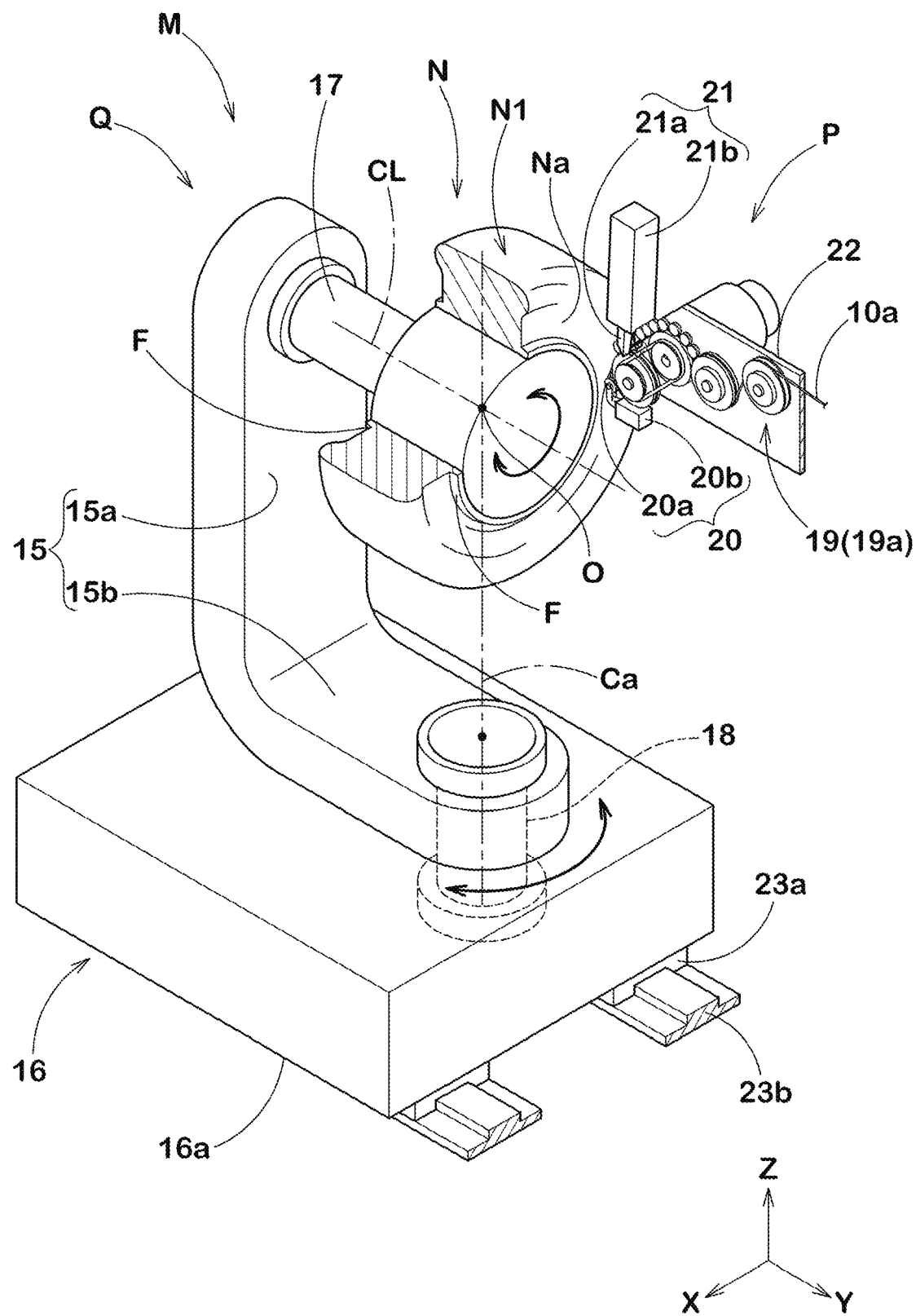
FIG. 3 is a perspective view illustrating a manufacturing apparatus for manufacturing a pneumatic tire.

As shown in FIG. 3, the apparatus M includes an inner core N having an outer surface N1 for molding the inner cavity (i) (shown in FIG. 1) of the tire, a driving device Q for rotating the inner core N, and a pasting device P for supplying the bead wire and pasting it directly or indirectly on the outer surface N1 of the inner core N.

The inner core N includes the outer surface N1, and a pair of flanges F each provided on its bead region of the inner core so as to protrude axially outwardly. The outer surface N1 has a three-dimensional shape that corresponds to an inner cavity of the tire under a 5% inflated condition in which the tire is mounted on the standard rim and inflated to a 5% inner pressure of the standard pressure. To obtain the tire 1 to be manufactured under the 5% inflated condition, the tire 1 is firstly inflated up to the standard pressure and then the inner pressure is reduced down to the 5% of the standard pressure. Preferably, the inner core N may be made of a metallic material or a heat-resistance resin to resist high temperature and pressure during the vulcanization process.

The outer surface N1 of the inner core N includes a pair of a bead molding surfaces Na for molding the bead portion 4 of the tire.

The driving device Q according to the present embodiment includes an arm 15 having a L-shape, and a base 16 that rotatably supports the arm 15. The base 16 is configured to a rectangular shape, for example.

The arm 15 is provided with a horizontally extending first supporting axis 17 at its upper end side, and a vertically extending second supporting axis 18 at its lower end side. Namely, the second supporting axis is along with the Z-axis. The first supporting axis 17 supports the inner core N so that the inner core N can rotate around the tire rotational axis CL. The second supporting axis 18 supports the arm 15 so that the arm 15 can turn around the turning center axis Ca that corresponds to a center of the second supporting axis 18. The rotational angle of the first supporting axis 17 and the turning angle of the second supporting axis 18 are controlled by a computer device based on previously programmed procedures. In this embodiment, the turning center axis Ca passes through a center O of the inner core N at which the tire rotational axis CL and the equatorial plane of the inner core N intersect.

The base 16 is movably provided along the Y-axis. In this embodiment, the base 16 is provided on its bottom side with a slider 23a guided on a rail 23b extending along the Y-axis.

The pasting device P includes a delivering roller 19, a pushing roller device 20, and a cutting tool 21. The delivering roller 19 guides the bead wire 10a sent out from the upstream side toward the inner core N through the pushing roller device 20. The pushing roller device 20 pushes the bead wire 10a sent out from the delivering roller 19 to paste it directly or indirectly on the outer surface N1 of the inner core N. The cutting tool 21 can cut the bead wire 10a. The bead wire 10a is previously coated with unvulcanized rubber so that the bead wire 10a is easily stuck on the inner core N.

Figure 4:
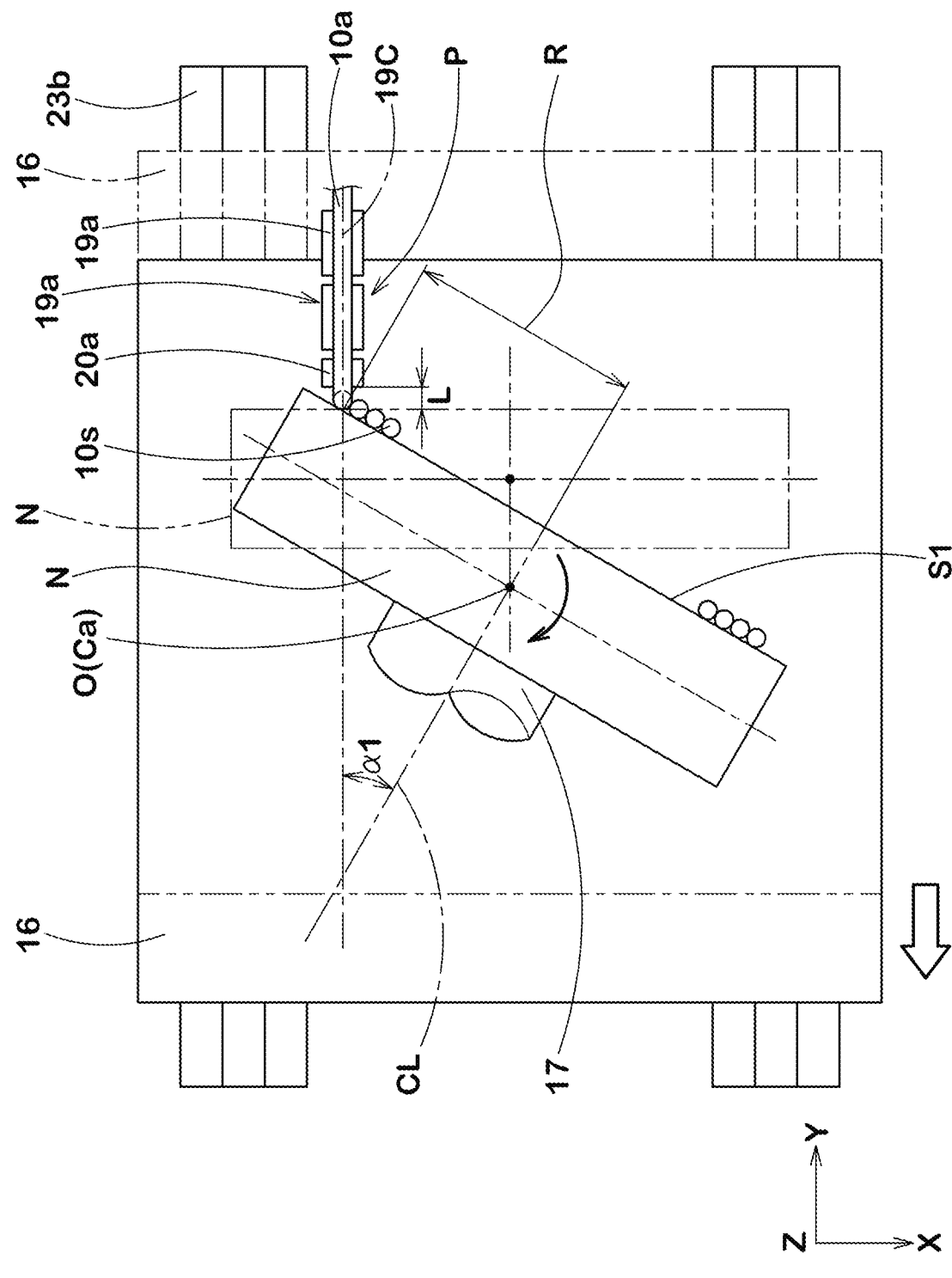
FIG. 4 is a plan view of the manufacturing apparatus for explaining a wire winding step.

The delivering roller 19 may further include a plurality of guide rollers 19a for removing a temporary unexpected crease such as curl or wave of the bead wire 10a. As shown in FIG. 4, the guide rollers 19a are rotatably supported on a bracket 22 and aligned so as to guide the bead wire 10a in a straight manner along the Y-axis.

The pushing roller device 20 includes a roller 20a that guides the bead wire 10a, and an actuator 20b such as a cylinder actuator that pushes the roller 20a toward the inner core N so as to paste the bead wire 10a thereon. In this embodiment, the equatorial plane of the roller 20a is arranged in the same plane of the equatorial plane 19C of the delivering roller 19 as shown in FIG. 4.

The cutting tool 21 includes a cutter 21a that can cut the bead wire 10a by pressing on it, and an actuator device 21b such as a cylinder actuator that can drive the cutter 21a downwardly to cut the bead wire 10a.

Hereinafter, a method for manufacturing the tire using the apparatus M will be described.

In the method, the inner core N is firstly rotatably attached on the first supporting axis 17 of the driving device Q. In the initial stage of the method, the pasting device P is positioned away from the inner core N.

Next, the inner portion 4ga of the chafer rubber 4g and the inner liner 9 which have sticky property are pasted on the outer surface N1 of the inner core N. Then the inner apex rubber 8i is attached on the outer surfaces of the chafer rubber 4g and the inner liner 9 (Shown in FIG. 5). In this embodiment, the outer surface of the inner apex rubber 8i includes the predetermined area S1 where the bead wire 10a should be wound.

Next, the bead molding surfaces Na of the inner core N is set its position to face the pushing roller device 20 of the pasting device P at a predetermined space so that the equatorial plane 19C of the delivering roller 19 is parallel to the tire rotational axis CL of the inner core N in the top view as shown in FIG. 4. Furthermore, the rotational axis Cr of the roller 20a is set in a height same as the tire rotational axis CL of the inner core N.

Next, a wire wound body forming step is performed to form the inner wire wound body 11. In this step, the bead wire 10a is continuously wound on the predetermined area S1 around the winding center 10c corresponding to the tire rotational axis CL.

The wire wound body forming step includes a wire fixing step (shown in FIG. 5) in which a winding-starting end 10s of the bead wire 10a is pushed and fixed on the predetermined area S1, and then a wire winding step (shown in FIG. 4) in which the bead wire 10a is spirally and continuously wound on the predetermined area S1 by rotating the inner core N around the tire rotational axis CL.

Figure 5:
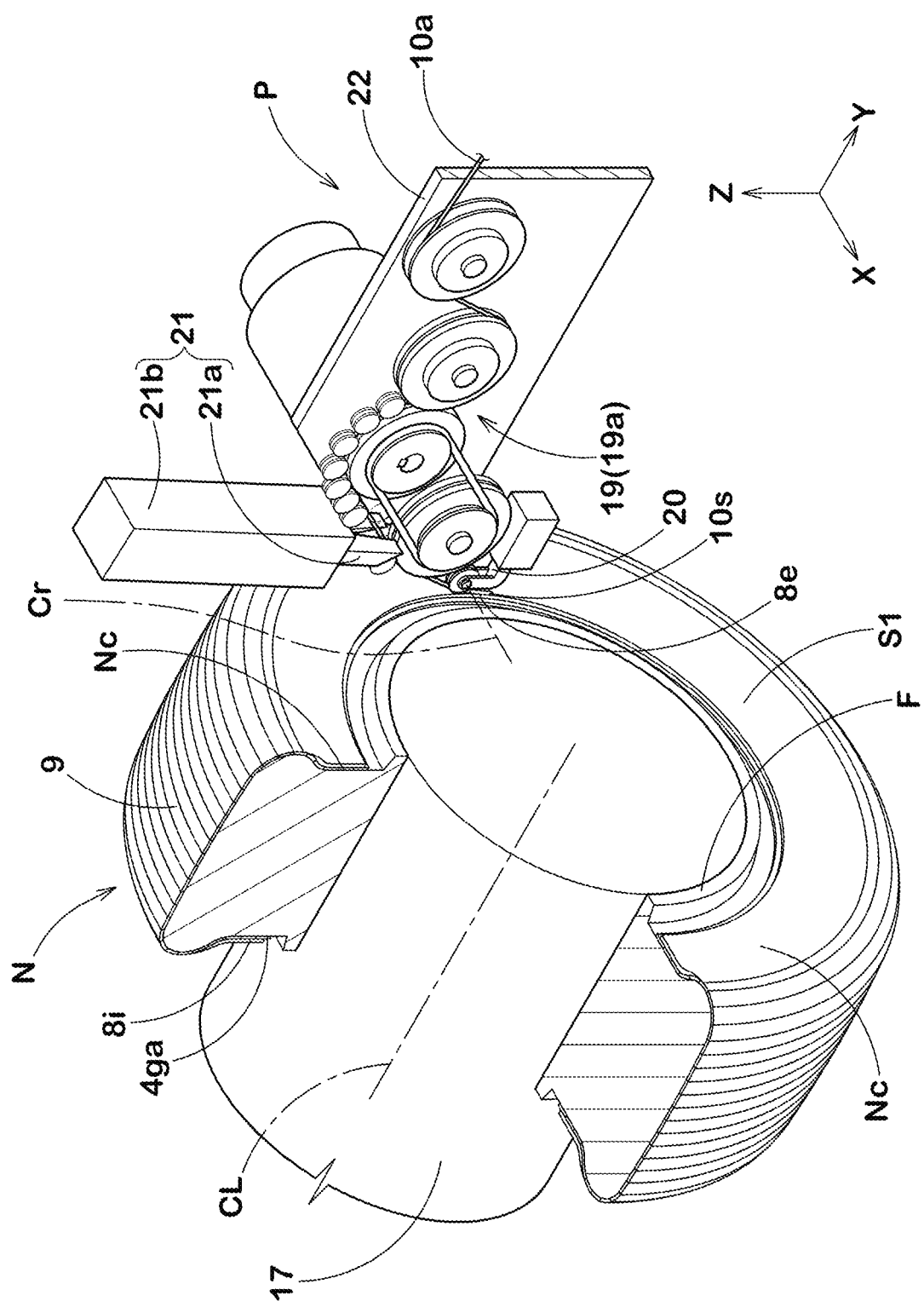
FIG. 5 is a perspective view of the manufacturing apparatus for explaining a wire fixing step.

In the wire fixing step, as shown in FIG. 5, the actuator 20b of the pushing roller device 20 forces the roller 20a so as to fix the starting-end 10s of the bead wire on the predetermined area S1 of the inner core N. Thus, the starting-end 10s is pasted on the predetermined area S1. In this embodiment, the starting-end 10s of the bead wire 10a is fixed at the radially innermost place 8t of the inner apex rubber 8i. Since the inner apex rubber 8i is an unvulcanized state having sticky property during the wire fixing step, the bead wire 10a may easily be pasted thereon.

The wire winding step alternately includes a first rotating step in which the inner core N is rotated to wind the bead wire 10a while maintaining an angle α1 in constant between the tire rotational axis CL and the Y-axis direction that is a feeding direction of the bead wire 10a to the internal core N, and a second rotating step in which the inner core N is rotated to wind the bead wire 10a while gradually increasing the angle α1.

Since the angle α1 is maintained substantially constant in the first winding step, the bead wire 10a is wound at a constant radius R from the tire rotational axis CL. Hence, the first part 13 is formed on the predetermined area S1.

As shown in FIG. 4, the angle α1 may be increased by turning the inner core N around the turning center axis Ca in a clockwise direction. The winding radius R of the bead wire 10a increases while increasing the angle α1. In the second winding step, the inner core N is rotated around the tire rotational axis CL while gradually increasing the angle α1 by turning the inner core N around the turning center axis Ca. Thus, the bead wire 10a is wound on the predetermined area S1 while increasing its winding radius R. Hence the second part 14 is formed. In FIG. 4, the inner core N which is under the initial condition of the wire winding step is illustrated by the two-dot chain line.

In the second winding step, when the inner core N is simply turned around the turning center axis Ca, the predetermined area S1 relatively moves toward the roller 20a, thereby decreasing the distance thereto. In the second winding step in accordance with the present embodiment, the inner core is moved backward along the Y-axis while being turned around the turning-center axis Ca to increase the angle α1. Thus, the distance L between the roller 20a and the predetermined area S1 along the equatorial plane of the roller 20a is maintained constant during second winding step. In this embodiment, the base 16 is moved along the Y-axis away from the pasting device P to maintain the distance constant. Thus, the second winding step described above may precisely wind the bead wire 10a on the predetermined area S1 of the inner core N without giving unnecessary bend and tension to the bead wire 10a.

As shown in FIG. 2, since radially adjacent layers 10a1 and 10a2 of bead wires 10a are arranged in contact with each other without a gap therebetween, these layers 10a1 and 10a2 are fixed each other to prevent spring-back of the bead wire 10a. Furthermore, such a configuration of layers 10a1 and 10b1 may enhance the strength of the wire wound body 11 such that it may firmly fix the carcass 6.

Next, a carcass forming step is performed by arranging the carcass ply 6A axially outward of the inner wire wound body 11. The carcass ply 8A comprises a plurality of radially extending rectangular plies (not shown) that are sequentially arranged in the circumferential direction of the tire.

Again, the wire wound body forming step is performed to form the outer wire wound body 12 on the predetermined area S2 which is previously decided in an outer surface of the carcass ply 6A. This step is done by the substantially same way forming the inner wire wound body 11 described above.

After forming the outer wire wound body 12, the outer apex rubber 8o, the inner portion 4ga of the chafer rubber 4g, the belt 7, the sidewall rubber 3G, and the tread rubber 2G are attached and assembled on the inner core N to form the green tire 1a. Then the green tire 1a with the inner core N is vulcanized in a tire mold to manufacture the tire 1 in accordance with present embodiment. Note that the tire 1 in accordance with the present invention is not limited to the one manufactured according to the method described above.

While the particularly preferable embodiments of the present invention have been described in detail, the present invention in not limited to the illustrated embodiments, but can be modified and carried out in various aspects.

Comparison Test

Pneumatic tires of 215/45R17 having the structure of FIG. 1 except for details shown in Table 1 were made, and tested with respect to its uniformity. Each tire has a bead core formed of the wire wound body shown in FIG. 2(a), FIG. 2(b) or FIG. 6(b).

The Test Methods are as Follows.

Uniformity Test

In each examples, radial force variation (RFV) on average of 50 tires was measured using a tire uniformity test machine based on the "Method of uniformity test for vehicle tires" defined by JASO C607. The average RFV of each examples is indicated by an index based on Ref. 1 being 100. The larger the index, the better the uniformity is.

Test results are shown in Table 1.

TABLE 1

Figure 2A:
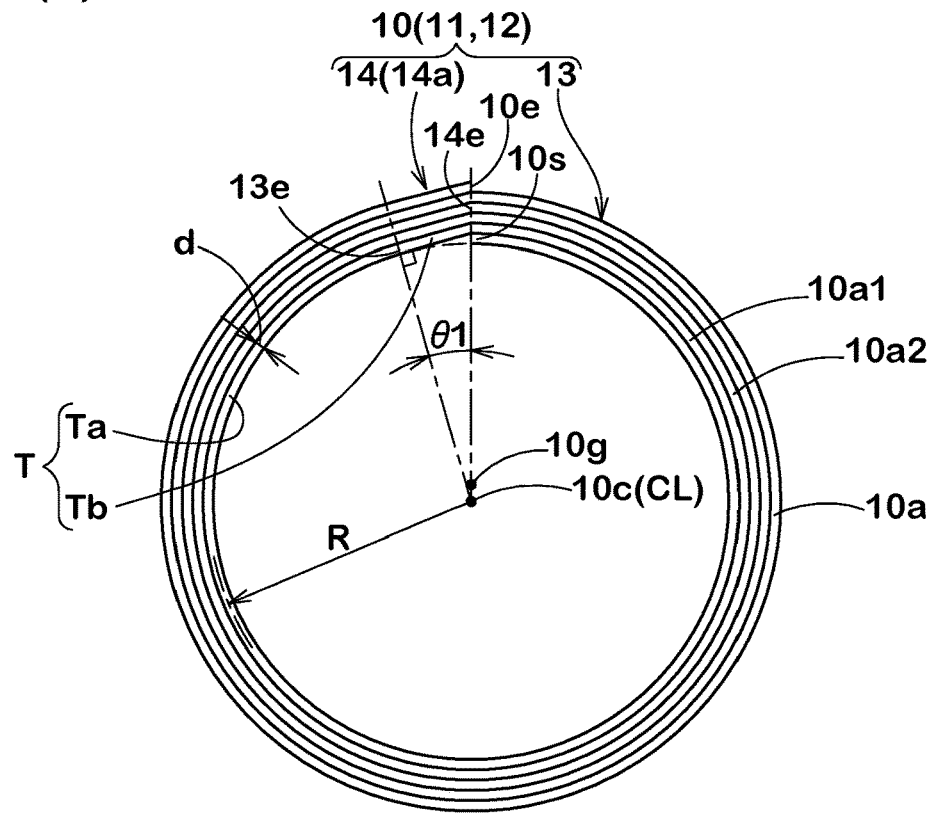
FIG. 2(a) is a side view of a wire wound body according to one embodiment of the present invention.
Figure 2B:
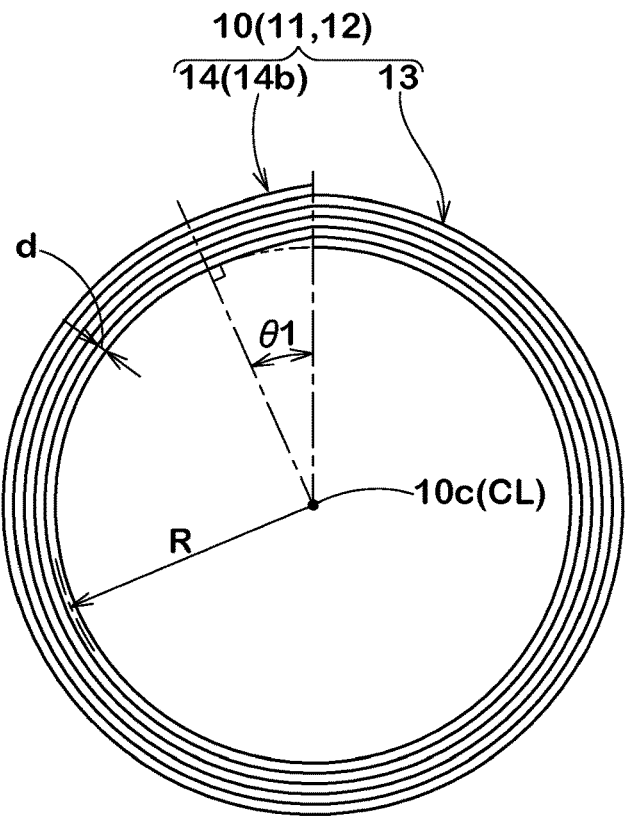
FIG. 2(*b*) is a side view of the wire wound body according to another embodiment of the present invention.

|  | Ex. 1 | Ex. 2 | Ex. 3 | Ex. 4 | Ex. 5 | Ex. 6 | Ex. 7 | Ex. 8 | Ref. 1 |
| --- | --- | --- | --- | --- | --- | --- | --- | --- | --- |
| Configuration of wire wound body | FIG. 2(a) | FIG. 2(a) | FIG. 2(a) | FIG. 2(a) | FIG. 2(a) | FIG. 2(a) | FIG. 2(a) | FIG. 2(b) | FIG. 6(b) |
| Central angle q1 of second part (deg.) | 2 | 4 | 7 | 12 | 15 | 20 | 22 | 12 | — |
| Uniformity RFV (N) | 88 | 82 | 81 | 80 | 81 | 82 | 88 | 79 | 100 |

As the results of the test, it is confirmed that the example tires exhibit better uniformity as compared to the Reference tire. Note that there is no big difference between the tires of FIG. 2(a) and FIG. 2(b).

DESCRIPTION OF THE REFERENCE NUMERALS

1 Pneumatic tire
2 Tread portion
3 Sidewall portion
4 Bead portion
5 Bead core
6 Carcass
10, 11, 12 Wire wound body
10a Bead wire
13 First part
14 Second part
CL Tire rotational axis
R Radius of bead wire

The invention claimed is:

1. A method for manufacturing a pneumatic tire comprising a tread portion, a pair of sidewall portions, a pair of bead portions each with a bead core therein, and a carcass extending between the bead cores, wherein
at least one of the bead cores comprises a wire wound body in which one bead wire is spirally wound in a continuous manner around a tire rotational axis so that a plurality of layers of the bead wire are formed in a radial direction of the tire, and
the wire wound body comprises a first part and a second part, the first part comprising a plurality of layers of the bead wire each extending in a circumferential direction of the tire having a constant radius from the tire rotational axis, and the second part comprising a plurality of layers of the bead wire each extending in the circumferential direction of the tire while changing its radius from the tire rotational axis,
the method comprising
a wire wound body forming step in which one bead wire is spirally wound in a continuous manner on a predetermined area of a side surface of an inner core to form the wire wound body, wherein the wire wound body forming step comprises
a wire fixing step in which a winding-starting end of the bead wire is pushed and fixed on the predetermined area, and then
a wire winding step in which the bead wire is spirally wound on the predetermined area by rotating the inner core around the tire rotational axis,
wherein the wire winding step comprises
a first rotating step in which the inner core rotates to wind the bead wire while maintaining a constant angle $\alpha 1$ between the tire rotational axis and a Y-axis direction that is a feeding direction of the bead wire to the inner core, and
a second rotating step in which the inner core rotates to wind the bead wire while gradually increasing the angle $\alpha 1$ wherein the angle $\alpha 1$ is increased by turning the inner core around a radial axis passing through a point "O" at which a core equatorial plane and the tire rotational axis intersect.

2. The method for manufacturing the pneumatic tire according to claim 1, wherein each layer of the bead wire of the second part extends in a straight manner.

3. A method for manufacturing a pneumatic tire comprising a tread portion, a pair of sidewall portions, a pair of bead portions each with a bead core therein, and a carcass extending between the bead cores, wherein
at least one of the bead cores comprises a wire wound body in which one bead wire is spirally wound in a continuous manner around a tire rotational axis so that a plurality of layers of the bead wire are formed in a radial direction of the tire, and
the wire wound body comprises a first part and a second part, the first part comprising a plurality of layers of the bead wire each extending in a circumferential direction of the tire having a constant radius from the tire rotational axis, and the second part comprising a plurality of layers of the bead wire each extending in the circumferential direction of the tire while changing its radius from the tire rotational axis,
the method comprising
a wire wound body forming step in which one bead wire is spirally wound in a continuous manner on a predetermined area of a side surface of an inner core to form the wire wound body, wherein the wire wound body forming step comprises
a wire fixing step in which a winding-starting end of the bead wire is pushed and fixed on the predetermined area, and then
a wire winding step in which the bead wire is spirally wound on the predetermined area by rotating the inner core around the tire rotational axis,
wherein the wire winding step comprises
a first rotating step in which the inner core rotates to wind the bead wire while maintaining a constant angle $\alpha 1$ between the tire rotational axis and a Y-axis direction that is a feeding direction of the bead wire to the inner core, and
a second rotating step in which the inner core rotates to wind the bead wire while gradually increasing the angle $\alpha 1$ and the inner core moves backward along the Y-axis while increasing the angle $\alpha 1$.

* * * * *